United States Patent
Ito et al.

(10) Patent No.: US 9,990,959 B1
(45) Date of Patent: Jun. 5, 2018

(54) DISK DRIVE BASE WITH DECREASED THICKNESS PORTION ANGLE BEING LESS THAN INCREASED THICKNESS PORTION ANGLE

(71) Applicant: Nidec Corporation, Kyoto (JP)

(72) Inventors: Michihiro Ito, Kyoto (JP); Yasutaka Ino, Kyoto (JP); Masaya Haraguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days. days.

(21) Appl. No.: 15/834,113

(22) Filed: Dec. 7, 2017

(30) Foreign Application Priority Data

Jun. 27, 2017 (JP) ................................ 2017-125404

(51) Int. Cl.
*G11B 33/02* (2006.01)
*G11B 25/04* (2006.01)

(52) U.S. Cl.
CPC ............ *G11B 33/022* (2013.01); *G11B 25/04* (2013.01)

(58) Field of Classification Search
None
See application file for complete search history.

(56) References Cited

U.S. PATENT DOCUMENTS

| 8,196,284 B2 | 6/2012 | Uefune et al. | |
| 2007/0002491 A1* | 1/2007 | Lim | G11B 33/142 360/97.14 |
| 2009/0237836 A1* | 9/2009 | Hendriks | G11B 25/043 360/97.14 |

* cited by examiner

*Primary Examiner* — Craig A. Renner
(74) *Attorney, Agent, or Firm* — Keating & Bennett, LLP (57) ABSTRACT

A base of a disk drive apparatus includes a bottom plate portion and a wall portion. The wall portion includes an increased thickness portion and a decreased thickness portion. An inner surface of the increased thickness portion includes a first slanting surface arranged to extend radially outward away from a central axis while extending axially away from the bottom plate portion. An inner surface of the decreased thickness portion includes a second slanting surface arranged to extend radially outward away from the central axis while extending axially away from the bottom plate portion, and protrude radially inward relative to the first slanting surface. An inclination angle of the second slanting surface with respect to an axial direction is arranged to be smaller than an inclination angle of the first slanting surface with respect to the axial direction.

9 Claims, 6 Drawing Sheets

Fig. 6

DISK DRIVE BASE WITH DECREASED THICKNESS PORTION ANGLE BEING LESS THAN INCREASED THICKNESS PORTION ANGLE

CROSS REFERENCE TO RELATED APPLICATIONS

This application claims the benefit of priority to Japanese Patent Application No. 2017-125404 filed on Jun. 27, 2017. The entire contents of this application are hereby incorporated herein by reference.

BACKGROUND OF THE INVENTION

1. Field of the Invention

The present invention relates to a base and a disk drive apparatus.

2. Description of the Related Art

A disk drive apparatus, such as, for example, a hard disk drive, has been known. The disk drive apparatus typically includes a spindle motor arranged to rotate a disk, a head arranged to perform reading and writing of information from or to the disk, and a base arranged to support the spindle motor and the head. A known base for use in a disk drive apparatus is described in, for example, JP-A 2009-245570. In a technique described in JP-A 2009-245570, a casting that is to become the base is defined by a die casting process, and thereafter, a disk opposed surface of a shroud is subjected to a cutting process to remove a portion of the disk opposed surface.

When a base is defined by casting, a molten metal is typically poured into a mold and is hardened therein. Then, the mold is opened, and the hardened base is separated from the mold. Thus, the base, which is a casting and includes a bottom plate portion and a wall portion, is defined. Here, if a side surface of the wall portion extends completely in parallel with a direction in which the hardened base is separated from the mold, frictional resistance between the mold and the wall portion will be so great as to make the mold release difficult. Therefore, the side surface of the wall portion is a slanting surface arranged to slightly slant with respect to the direction in which the hardened base is separated from the mold.

However, when the wall portion of the base has a rectangular outer surface and an arc-shaped inner surface, the wall portion includes decreased thickness portions each of which has a small thickness. If each decreased thickness portion is provided with a slanting surface as described above, the thickness of the decreased thickness portion of the wall portion becomes extremely small. This will make it difficult for the molten metal to spread throughout a portion of a cavity in the mold which corresponds to the decreased thickness portion when the base is cast. In particular, there has been a strong demand for miniaturization of disk drive apparatuses in recent years. The above-described problem is particularly significant with a base used in a small-sized disk drive apparatus.

SUMMARY OF THE INVENTION

The present invention has been conceived to provide a technique for facilitating separation of a cast base from a mold, and making it easier for a molten metal to spread throughout a portion of a cavity in the mold which corresponds to a decreased thickness portion when the base is cast.

A base according to a preferred embodiment of the present invention is a casting and is used in a disk drive apparatus to support a motor arranged to rotate a disk about a central axis extending in a vertical direction. The base includes a bottom plate portion arranged to extend perpendicularly to the central axis, and a wall portion arranged to extend upward from a peripheral portion of the bottom plate portion. The wall portion includes an increased thickness portion, and a decreased thickness portion arranged to have a radial thickness smaller than that of the increased thickness portion. An inner surface of the increased thickness portion includes a first slanting surface arranged to extend radially outward away from the central axis while extending axially away from the bottom plate portion. An inner surface of the decreased thickness portion includes a second slanting surface arranged to extend radially outward away from the central axis while extending axially away from the bottom plate portion, and protrude radially inward relative to the first slanting surface. An inclination angle of the second slanting surface with respect to an axial direction is arranged to be smaller than an inclination angle of the first slanting surface with respect to the axial direction.

According to the above preferred embodiment of the present invention, the wall portion includes an inner surface arranged to slant so as to extend radially outward away from the central axis while extending axially away from the bottom plate portion. This makes it easier to separate the cast base from a mold. In addition, the second slanting surface is arranged to protrude radially inward relative to the first slanting surface. This makes it easier for a metal to spread throughout a portion of a cavity in the mold which corresponds to the decreased thickness portion when the base is cast.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor arranged to rotate a disk is referred to by the term "axial direction", "axial", or "axially", that directions perpendicular to the central axis are each referred to by the term "radial direction", "radial", or "radially", and that a direction along a circular arc centered on the central axis is referred to by the term "circumferential direction", "circumferential", or "circumferentially". It is also assumed herein that an axial direction is a vertical direction, and that a side on which a cover is arranged with respect to a base is an upper side, and the shape of each member or portion and relative positions of different members or portions will be described based on the above assumptions. It should be noted, however, that the above definitions of the vertical direction and the upper and lower sides are not meant to restrict in any way the orientation of a base or a disk drive apparatus according to any preferred embodiment of the present invention when in use.

1. Structure of Disk Drive Apparatus

Figure 1:
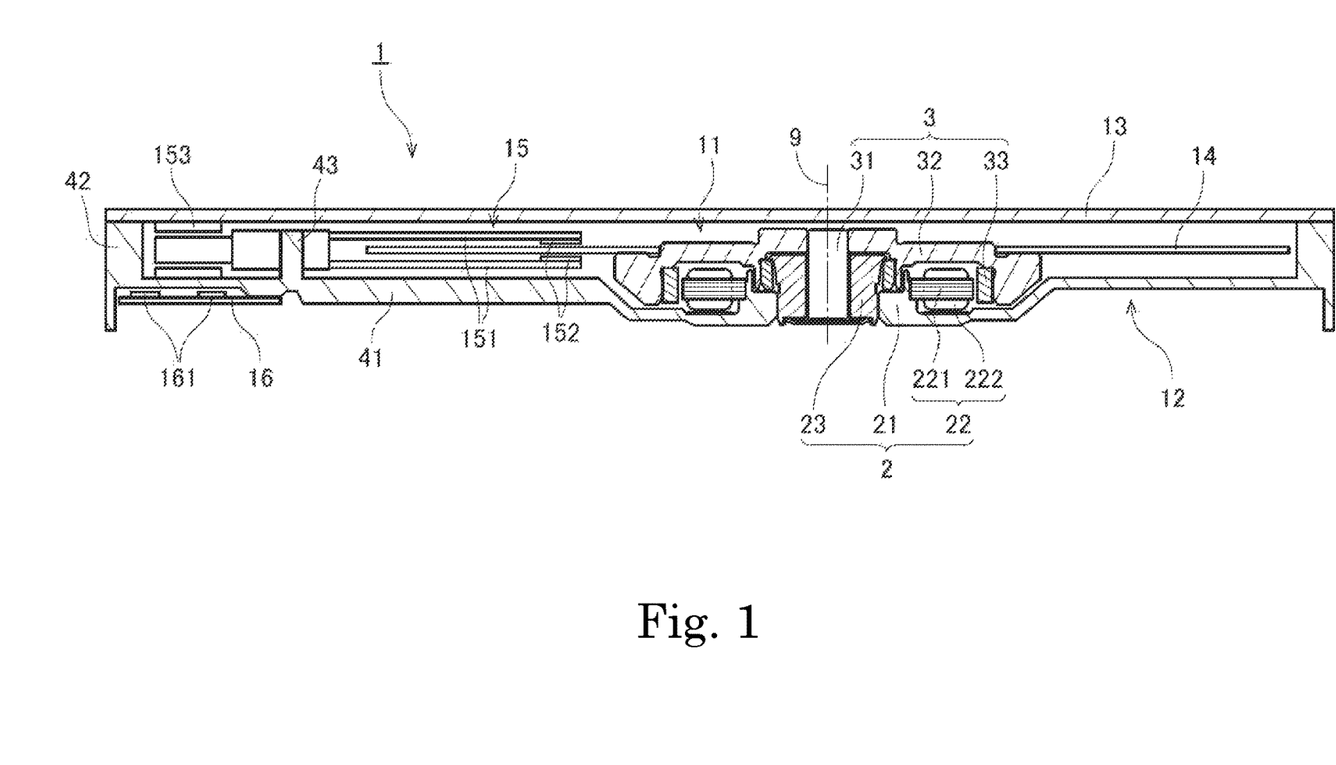
FIG. 1 is a vertical sectional view of a disk drive apparatus according to a preferred embodiment of the present invention.

FIG. 1 is a vertical sectional view of a disk drive apparatus 1 according to a preferred embodiment of the present invention.

The disk drive apparatus 1 is an apparatus arranged to perform reading and writing of information from or to a disk-shaped magnetic disk 14 including a circular hole in a center thereof while rotating the magnetic disk 14. Referring to FIG. 1, the disk drive apparatus 1 includes a spindle motor 11, a base 12, a cover 13, the magnetic disk 14, an access portion 15, and a circuit board 16.

The spindle motor 11 is a device arranged to rotate the magnetic disk 14 about a central axis 9 while supporting the magnetic disk 14. The spindle motor 11 includes a stationary portion 2 and a rotating portion 3. The stationary portion 2 is arranged to be stationary relative to both the base 12 and the cover 13. The rotating portion 3 is supported to be rotatable with respect to the stationary portion 2.

The stationary portion 2 includes a stator support portion 21, a stator 22, and a bearing unit 23. The stator support portion 21 is arranged to extend in an axial direction to assume a cylindrical shape around the central axis 9. The stator support portion 21 defines a portion of the spindle motor 11 and a portion of the base 12. The stator 22 includes a stator core 221, which is a magnetic body, and a plurality of coils 222. The stator core 221 is fixed to an outer circumferential surface of the stator support portion 21. The stator core 221 includes a plurality of teeth arranged to project radially outward. Each of the coils 222 is defined by a conducting wire wound around a separate one of the teeth. The bearing unit 23 is fixed to an inner circumferential surface of the stator support portion 21. The bearing unit 23 is arranged to rotatably support a shaft 31, which is included in the rotating portion 3. A fluid dynamic bearing mechanism, for example, is used as the bearing unit 23.

The rotating portion 3 includes the shaft 31, a hub 32, and a rotor magnet 33. The shaft 31 is a columnar member arranged to extend along the central axis 9. A lower end portion of the shaft 31 is accommodated inside of the bearing unit 23. The hub 32 is arranged to extend radially outward from a peripheral portion of an upper end portion of the shaft 31. The magnetic disk 14 is fixed to the hub 32 while being oriented perpendicular to the central axis 9. The rotor magnet 33 is fixed to the hub 32 radially outside of the stator 22. A magnet in the shape of a circular ring, for example, is used as the rotor magnet 33. An inner circumferential surface of the rotor magnet 33 includes north and south poles arranged to alternate with each other in a circumferential direction.

Once electric drive currents are supplied to the coils 222 in the spindle motor 11 as described above, magnetic flux is generated around each of the teeth of the stator core 221. Then, a circumferential torque is produced by interaction between the magnetic flux of the teeth and that of the rotor magnet 33, so that the rotating portion 3 is caused to rotate about the central axis 9 with respect to the stationary portion 2. The rotation of the rotating portion 3 causes the magnetic disk 14, which is supported by the hub 32, to rotate about the central axis 9.

The base 12 is a substantially plate-shaped member arranged to support the spindle motor 11 and the access portion 15. The base 12 is a so-called casting obtained by pouring a metal into a mold and hardening the metal therein. Aluminum or an aluminum alloy, for example, is used as the metal material of the base 12.

Figure 2:
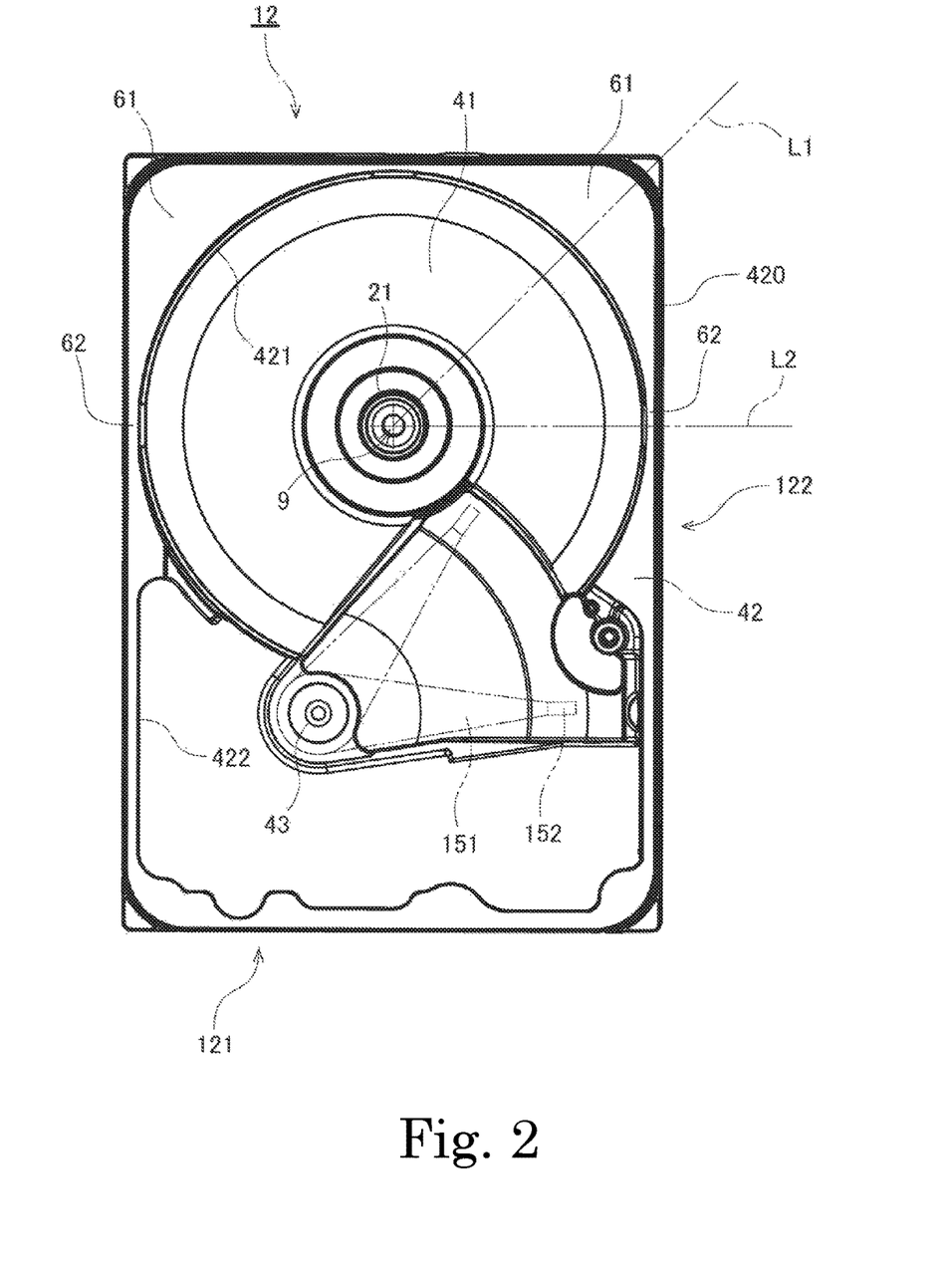
FIG. 2 is a top view of a base according to a preferred embodiment of the present invention.

FIG. 2 is a top view of the base 12. Referring to FIGS. 1 and 2, the base 12 includes the aforementioned stator support portion 21, a bottom plate portion 41, a wall portion 42, and a pivot post 43. The bottom plate portion 41 is arranged to extend perpendicularly to the central axis 9 below the rotating portion 3 of the spindle motor 11, the magnetic disk 14, and the access portion 15. The bottom plate portion 41 is rectangular in a plan view. A lower end portion of the stator support portion 21 and the bottom plate portion 41 are continuous with each other. The wall portion 42 is a rectangular and tubular portion arranged to extend upward from a peripheral portion of the bottom plate portion 41. The pivot post 43 is columnar and is arranged to project upward from an upper surface of the bottom plate portion 41 at a position corresponding to a center on which arms 151, which will be described below, swing.

The shape of the wall portion 42 of the base 12 will be described in more detail below.

The cover 13 is supported by an upper end surface of the wall portion 42 of the base 12. An upper opening of the base 12 is covered with the cover 13. That is, the cover 13 is arranged to cover an upper side of the base 12. The base 12 and the cover 13 are fixed to each other through, for example, screws. The rotating portion 3 of the spindle motor 11, the magnetic disk 14, and the access portion 15 are housed in a casing defined by the base 12 and the cover 13.

The access portion 15 includes the arms 151, heads 152 arranged at tips of the arms 151, and an actuator mechanism 153. Each arm 151 is attached to the pivot post 43 of the base 12 through a bearing. The actuator mechanism 153 is a mechanism to cause each of the arms 151 and the heads 152 to swing. Once the actuator mechanism 153 is driven, the arm 151 is caused to swing on the pivot post 43. The head 152 is thus arranged to move along a recording surface of the magnetic disk 14. The heads 152 are arranged opposite to an upper surface and a lower surface of the magnetic disk 14, and are arranged to perform reading and writing of information from or to the magnetic disk 14.

Note that each head 152 may alternatively be arranged to perform only one of the reading and the writing of information from or to the magnetic disk 14. Also note that the disk drive apparatus 1 may alternatively be arranged to include two or more magnetic disks 14. Also note that the disk drive apparatus 1 may alternatively be an apparatus arranged to rotate an optical disk.

The circuit board 16 is fixed to a lower surface of the bottom plate portion 41 of the base 12. A so-called rigid board, which has a small degree of flexibility, for example, is used as the circuit board 16. An electrical circuit needed for an operation of the disk drive apparatus 1 is mounted on the circuit board 16. The electrical circuit may be a circuit for an operation of the spindle motor 11, a circuit for an operation of the actuator mechanism 153, or a circuit for detecting various signals. A plurality of electronic components 161 used to form the electrical circuit are mounted on an upper surface of the circuit board 16. The circuit board 16 is connected to the coils 222 of the spindle motor 11 through a so-called flexible printed circuit board (not shown), which is highly flexible.

2. Detailed Shape of Wall Portion

Next, the detailed shape of the wall portion 42 of the base 12 will now be described below.

Referring to FIG. 2, the base 12 according to the present preferred embodiment is rectangular and has short sides 121 and long sides 122 in a plan view. A direction parallel to the short sides 121 of the base 12 will be hereinafter referred to as a "widthwise direction". In addition, a direction parallel to the long sides 122 of the base 12 will be hereinafter referred to as a "longitudinal direction".

The wall portion 42 includes an outer surface 420 which is rectangular and is arranged to extend along an outer edge of the base 12 in a plan view. Meanwhile, an inner surface of the wall portion 42 includes an arc-shaped inner surface 421 and a rectangular inner surface 422. The arc-shaped inner surface 421 is a surface having the shape of a circular arc with the central axis 9 as a center in a plan view. The rectangular inner surface 422 is a rectangular surface extending substantially in parallel with a portion of the outer surface 420 in a plan view. The arc-shaped inner surface 421 and the rectangular inner surface 422 are adjacent to each other in the longitudinal direction. The rotating portion 3 of the spindle motor 11 and the magnetic disk 14 are accommodated radially inside of the arc-shaped inner surface 421. The access portion 15 is accommodated inside of the rectangular inner surface 422.

When the base 12 is cast, a molten metal is first poured into a cavity in a mold, and is hardened therein. Then, the mold is opened, and the hardened base 12 is separated from the mold in the axial direction. Each of the arc-shaped inner surface 421 and the rectangular inner surface 422 is arranged to slightly slant with respect to the axial direction to facilitate the separation of the base 12 from the mold. Specifically, the arc-shaped inner surface 421 is arranged to slant so as to gradually extend radially outward away from the central axis 9 while extending axially upward away from the bottom plate portion 41. In addition, the rectangular inner surface 422 is arranged to slant so as to gradually enlarge a space inside of the rectangular inner surface 422 while extending axially upward from the bottom plate portion 41. Frictional resistance at the time of the mold release is thus made smaller than in the case where each of the arc-shaped inner surface 421 and the rectangular inner surface 422 extends in the axial direction.

The wall portion 42 includes a plurality of increased thickness portions 61 and a plurality of decreased thickness portions 62 radially outside of the arc-shaped inner surface 421. Each increased thickness portion 61 is a portion of the wall portion 42 which has a boundary between one of the short sides 121 and one of the long sides 122 of the base 12 as a center thereof. That is, the increased thickness portion 61 is arranged between the arc-shaped inner surface 421 and a portion of the outer surface 420 at and near a corner of the rectangular wall portion 42. Each decreased thickness portion 62 is a portion of the wall portion 42 which has a position that coincides with the central axis 9 when viewed in the widthwise direction as a center thereof, or a portion of the wall portion 42 which has a position that coincides with the central axis 9 when viewed in the longitudinal direction as a center thereof. Each decreased thickness portion 62 is arranged to have a radial thickness smaller than that of each increased thickness portion 61.

Figure 3:
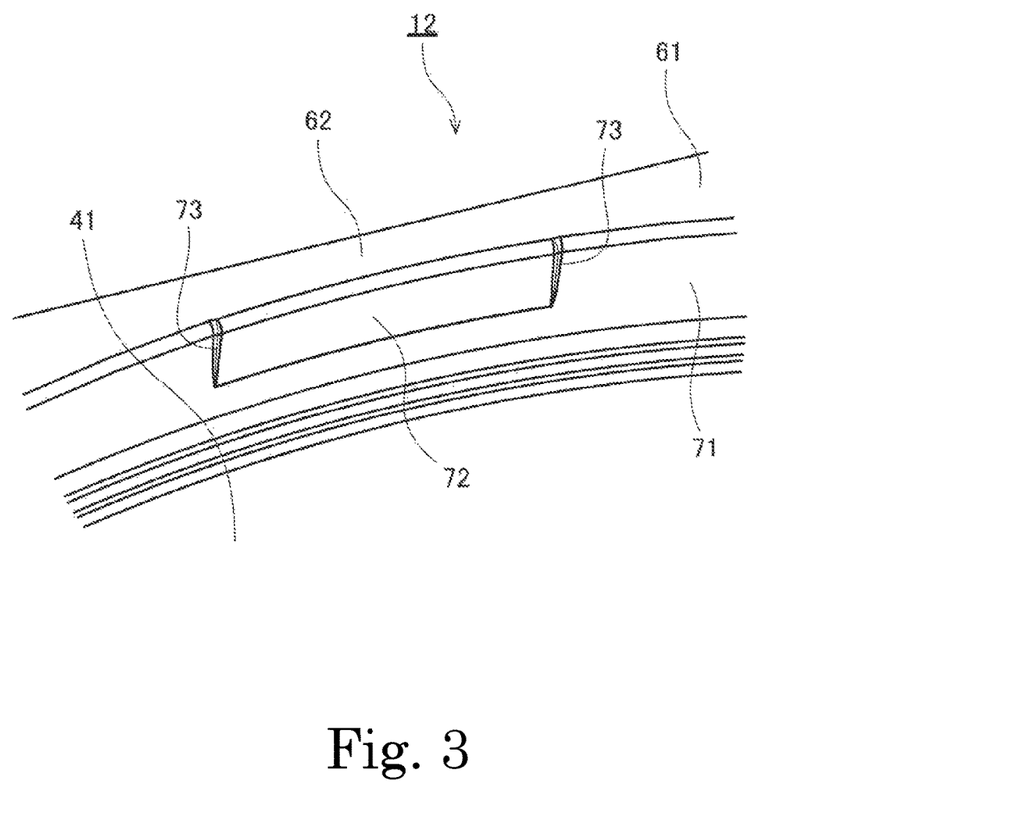
FIG. 3 is a partial perspective view of the base.
Figure 4:
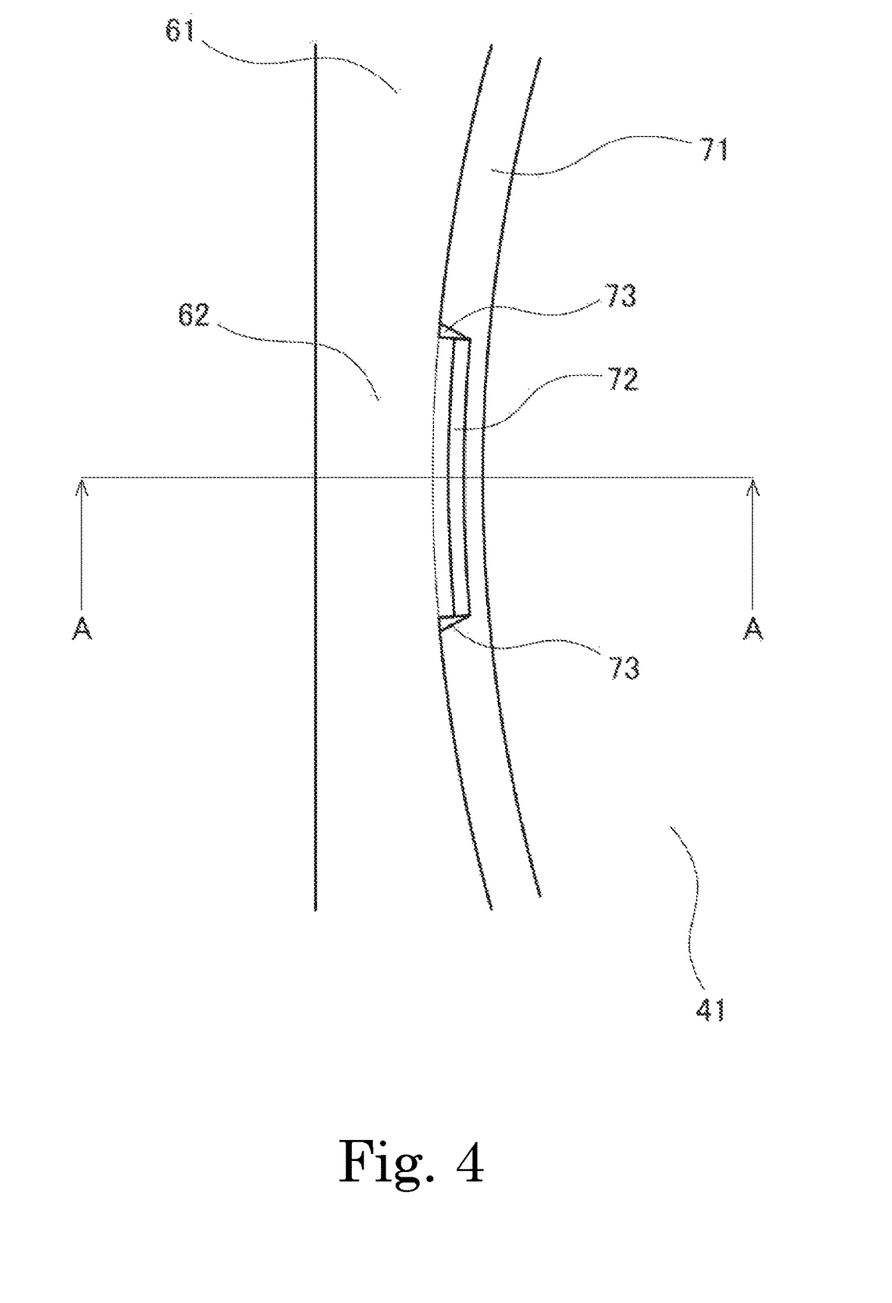
FIG. 4 is a partial top view of the base.
Figure 5:
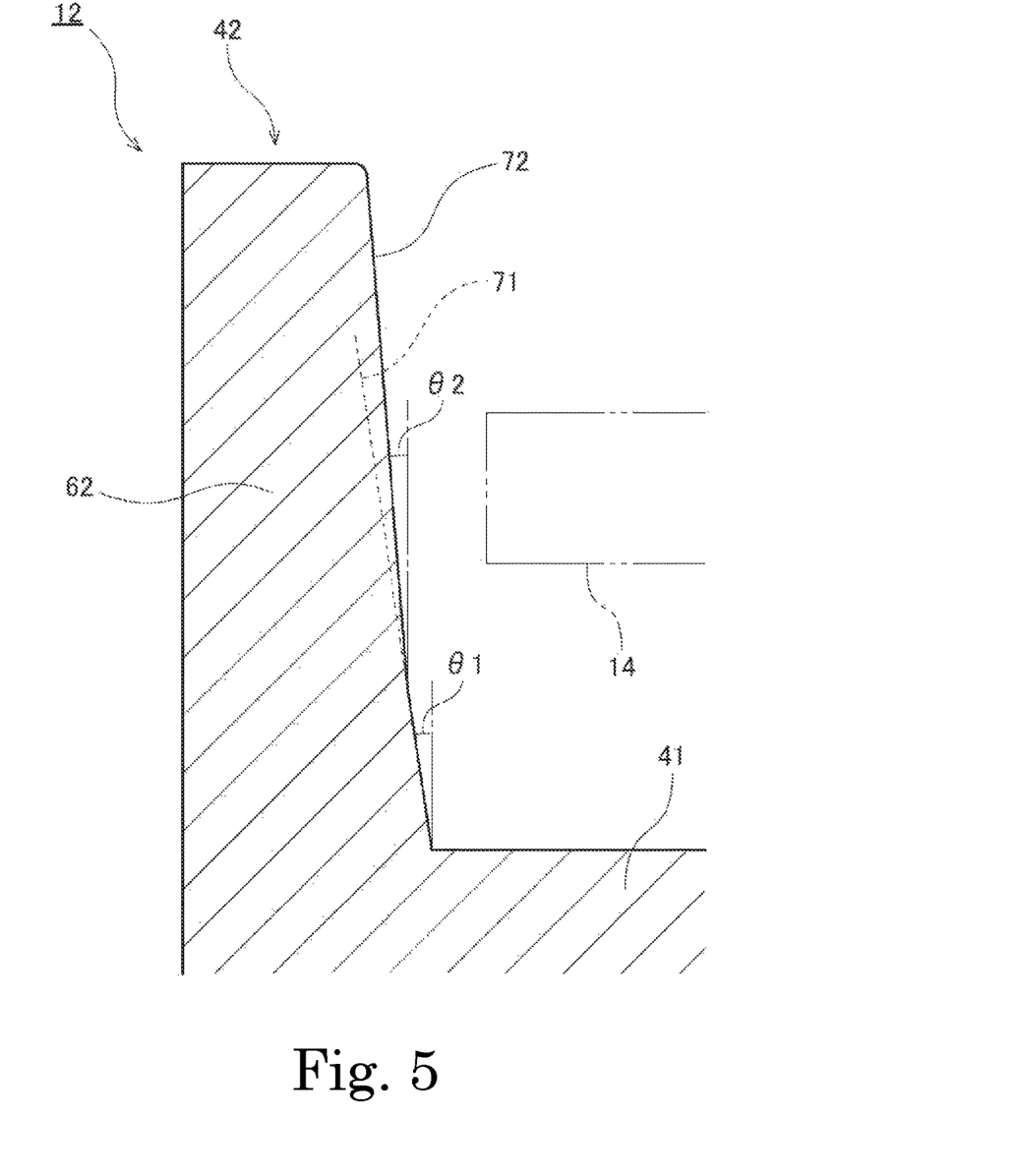
FIG. 5 is a partial vertical sectional view of the base.

FIG. 3 is a partial perspective view of the base 12, illustrating one of the decreased thickness portions 62 and its vicinity. FIG. 4 is a partial top view of the base 12, illustrating the decreased thickness portion 62 and its vicinity. FIG. 5 is a partial vertical sectional view of the base 12 taken along line A-A in FIG. 4. Referring to FIGS. 3 to 5, an inner surface of each increased thickness portion 61 includes a first slanting surface 71. In addition, an inner surface of each decreased thickness portion 62 includes a second slanting surface 72. That is, the arc-shaped inner surface 421 includes a plurality of first slanting surfaces 71 and a plurality of second slanting surfaces 72. Referring to FIG. 2, each first slanting surface 71 includes a point of intersection of the arc-shaped inner surface 421 with an imaginary line L1 that passes through the central axis 9 and a vertex of the rectangular outer surface 420 in a plan view. Each second slanting surface 72 includes a point of intersection of the arc-shaped inner surface 421 with an imaginary line L2 that passes through the central axis 9 and is perpendicular to a short side or a long side of the rectangular outer surface 420 in a plan view.

As described above, each of the first and second slanting surfaces 71 and 72 is arranged to slant with respect to the axial direction so as to gradually extend radially outward away from the central axis 9 while extending axially upward away from the bottom plate portion 41. An inclination angle of each second slanting surface 72 with respect to the axial direction is arranged to be smaller than an inclination angle of each first slanting surface 71 with respect to the axial direction. In addition, each second slanting surface 72 is arranged to protrude radially inward relative to the first slanting surfaces 71. This makes the radial thickness of each decreased thickness portion 62 greater than in the case where each second slanting surface 72 does not protrude radially inward. This in turn makes it easier for the molten metal to spread throughout a portion of the cavity in the mold which corresponds to the decreased thickness portion 62 when the base 12 is cast. This results in a reduced likelihood that a failure in the casting, such as, for example, a recess or a hollow in the decreased thickness portion 62, will occur.

Referring to FIG. 5, it is assumed here that the inclination angle of the first slanting surface 71 with respect to the axial direction is denoted by θ1. It is also assumed that the inclination angle of the second slanting surface 72 with respect to the axial direction is denoted by θ2. The inclination angles θ1 and θ2 should not be so small as to permit a large frictional resistance at the time of the mold release. Thus, each of the inclination angles θ1 and θ2 is preferably 1.5° or more, for example. In addition, the inclination angle θ2 should not be so large as to make it difficult to ensure a sufficient radial thickness of an upper end portion and its vicinity of the decreased thickness portion 62. Thus, the inclination angle θ2 is preferably 2.5° or less, for example. That is, it is preferable that the inclination angles θ1 and θ2 satisfy both the following inequalities (1) and (2):

$$\theta 2 < \theta 1 \quad (1)$$

$$1.5° \leq \theta 2 \leq 2.5° \quad (2)$$

Each decreased thickness portion 62 is arranged to have a circumferential extent smaller than that of each increased thickness portion 61. Accordingly, the second slanting surface 72 has a circumferential extent smaller than that of the first slanting surface 71. Thus, in the present preferred embodiment, the first slanting surface 71, which has a relatively large inclination angle, is wider than the second slanting surface 72, which has a relatively small inclination angle. This makes it easier to separate the cast base 12 from the mold.

In addition, in the present preferred embodiment, the second slanting surface 72 is arranged to extend from an axial position above a lower end of the decreased thickness portion 62 to an upper end of the decreased thickness portion 62. This makes it easier to secure a sufficient radial space radially inside of the second slanting surface 72 than in the case where the second slanting surface 72 extends from the lower end of the decreased thickness portion 62. Thus, a sufficient radial space is more easily secured between the second slanting surface 72 and an outer circumferential portion of the magnetic disk 14. This results in a reduction in air resistance between the second slanting surface 72 and the magnetic disk 14, facilitating smooth rotation of the magnetic disk 14.

In addition, in the present preferred embodiment, the second slanting surface 72 is arranged to extend from an axial position below an axial middle position of the decreased thickness portion 62 to the upper end of the decreased thickness portion 62. This leads to an increase in the extent of a portion of the decreased thickness portion 62 which protrudes radially inward relative to the first slanting surfaces 71. This in turn makes it easier for the metal to spread throughout the portion of the cavity in the mold which corresponds to the decreased thickness portion when the base 12 is cast. It is assumed here that the aforementioned "axial middle position of the decreased thickness portion 62" refers to an axial midpoint between the upper end of the decreased thickness portion 62 and the upper surface of the bottom plate portion 41.

In addition, referring to FIGS. 3 and 4, the arc-shaped inner surface 421 includes a plurality of connection surfaces 73. Each connection surface 73 is arranged between adjacent ones of the first and second slanting surfaces 71 and 72 to circumferentially join the adjacent first and second slanting surfaces 71 and 72 to each other. In the present preferred embodiment, the connection surface 73 is not a shoulder surface extending in a radial direction but a tapered surface angled with respect to the radial direction. That is, the adjacent first and second slanting surfaces 71 and 72 are joined to each other by a smooth surface without a right or acute angle. This leads to a reduction in air resistance in the vicinity of each second slanting surface 72 when the magnetic disk 14 is rotating. Accordingly, despite the protrusion of portions of the arc-shaped inner surface 421, noise caused when the disk drive apparatus 1 is running can be minimized.

3. Example Modifications

While a preferred embodiment of the present invention has been described above, it will be understood that the present invention is not limited to the above-described preferred embodiment.

Figure 6:
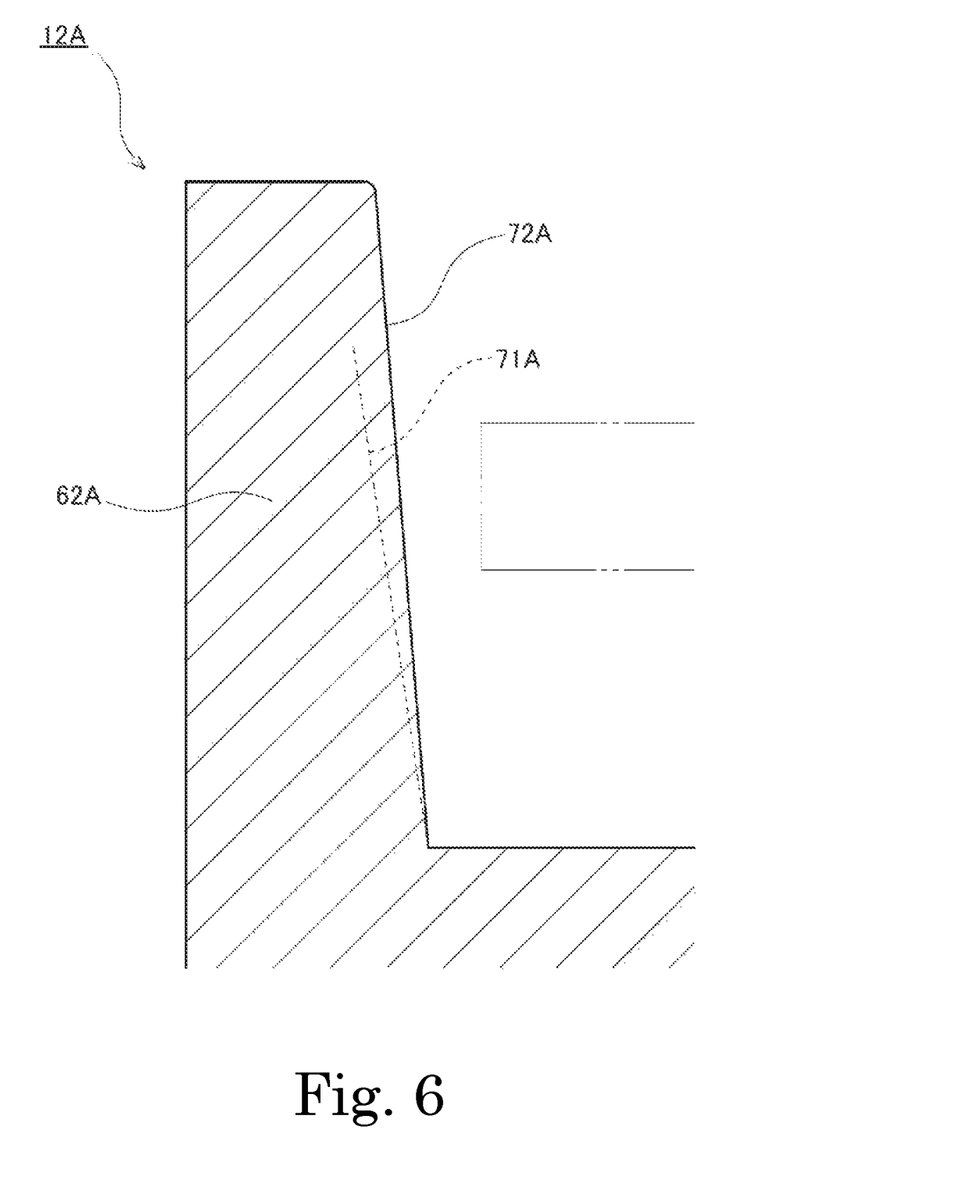
FIG. 6 is a partial vertical sectional view of a base according to a modification of the above preferred embodiment of the present invention.

FIG. 6 is a partial vertical sectional view of a base 12A according to a modification of the above-described preferred embodiment. In the above-described preferred embodiment, the second slanting surface 72 is arranged to extend from an axial position above the lower end of the decreased thickness portion 62 to the upper end of the decreased thickness portion 62. In contrast, in the modification illustrated in FIG. 6, a second slanting surface 72A is arranged to extend from an axially lower end to an axially upper end of a decreased thickness portion 62A. This makes a radially inward protrusion of the second slanting surface 72A relative to first slanting surfaces 71A greater than the radially inward protrusion of the second slanting surface 72 relative to the first slanting surfaces 71 in the above-described preferred embodiment. That is, an additional increase in the radial thickness of the decreased thickness portion 62A is achieved. This makes it easier for a molten metal to spread throughout a portion of a cavity in a mold which corresponds to the decreased thickness portion 62A when the base 12A is cast.

Note that a spindle motor included in a disk drive apparatus according to a preferred embodiment of the present invention may have a structure different from that of the spindle motor 11 according to the above-described preferred embodiment. For example, a spindle motor included in a disk drive apparatus according to a preferred embodiment of the present invention may be a spindle motor of a so-called fixed-shaft type, in which a hub is arranged to rotate about a stationary shaft.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, bases and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base being a casting and used in a disk drive apparatus to support a motor arranged to rotate a disk about a central axis extending in a vertical direction, the base comprising:
   a bottom plate portion arranged to extend perpendicularly to the central axis; and
   a wall portion arranged to extend upward from a peripheral portion of the bottom plate portion; wherein
   the wall portion includes:
   an increased thickness portion; and
   a decreased thickness portion arranged to have a radial thickness smaller than that of the increased thickness portion;
   an inner surface of the increased thickness portion includes a first slanting surface arranged to extend radially outward away from the central axis while extending axially away from the bottom plate portion;
   an inner surface of the decreased thickness portion includes a second slanting surface arranged to extend radially outward away from the central axis while extending axially away from the bottom plate portion, and protrude radially inward relative to the first slanting surface; and
   an inclination angle of the second slanting surface with respect to an axial direction is arranged to be smaller than an inclination angle of the first slanting surface with respect to the axial direction.

2. The base according to claim 1, wherein the second slanting surface is arranged to extend from a lower end of the decreased thickness portion or an axial position above the lower end of the decreased thickness portion to an upper end of the decreased thickness portion.

3. The base according to claim 2, wherein the second slanting surface is arranged to extend from an axial position above the lower end of the decreased thickness portion to the upper end of the decreased thickness portion.

4. The base according to claim 3, wherein the second slanting surface is arranged to extend from an axial position below an axial middle position of the decreased thickness portion to the upper end of the decreased thickness portion.

5. The base according to claim 1, wherein the inclination angle of the second slanting surface with respect to the axial direction is in a range of 1.5° to 2.5° both inclusive.

6. The base according to claim 1, wherein
the wall portion includes a rectangular outer surface;
an inner surface of the wall portion includes an arc-shaped inner surface in a shape of a circular arc with the central axis as a center; and
the second slanting surface includes a point of intersection of the arc-shaped inner surface with an imaginary line that passes through the central axis and is perpendicular to the outer surface.

7. The base according to claim 1, wherein the second slanting surface is arranged to have a circumferential extent smaller than that of the first slanting surface.

8. The base according to claim 1, wherein
an inner surface of the wall portion includes a connection surface arranged to circumferentially join the first and second slanting surfaces to each other; and
the connection surface is a tapered surface angled with respect to a radial direction.

9. A disk drive apparatus comprising:
the base of claim 1;
a motor arranged to rotate the disk about the central axis;
a head arranged to perform at least one of reading and writing of information from or to the disk; and
a cover arranged to cover an upper side of the base.

* * * * *